L. W. KINGRY & T. J. ABEL.
Improvement in Brakes for Sewing-Machines.
No. 131,402. Patented Sep. 17, 1872.
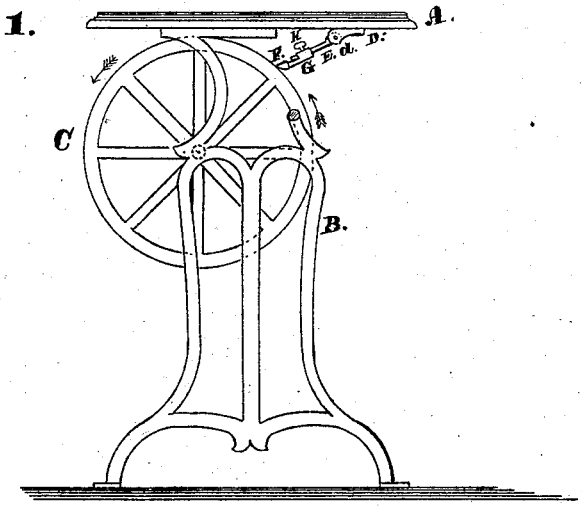
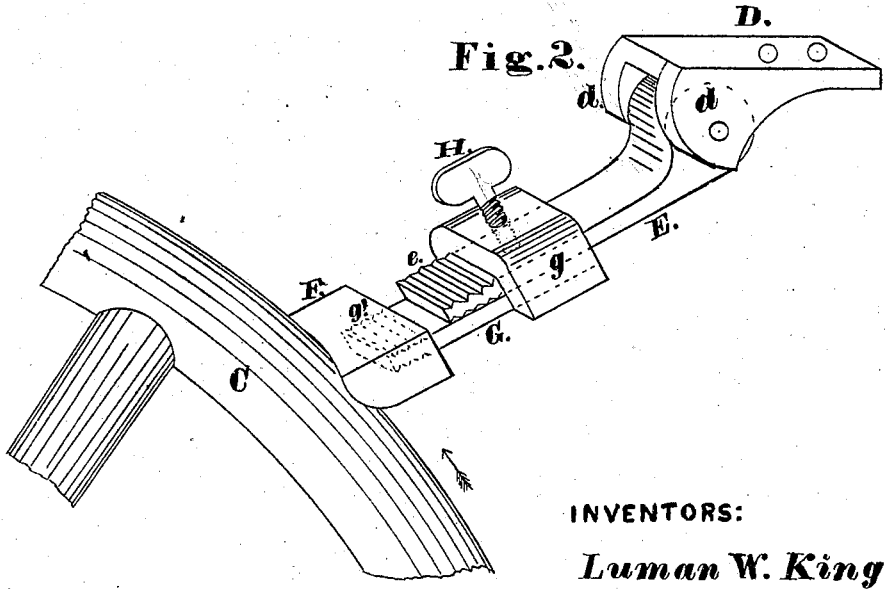
WITNESSES:
John Hildinger
Robert R. Montgomery
INVENTORS:
Luman W. Kingry,
Thomas J. Abel.
Per. Charles P. Housum
THEIR ATTORNEY.

UNITED STATES PATENT OFFICE.

LUMAN W. KINGRY AND THOMAS J. ABEL, OF DECATUR, ILLINOIS.

IMPROVEMENT IN BRAKES FOR SEWING-MACHINES.

Specification forming part of Letters Patent No. 131,402, dated September 17, 1872.

*To all whom it may concern:*

Be it known that we, LUMAN W. KINGRY and THOMAS J. ABEL, of Decatur, in the county of Macon and State of Illinois, have invented certain Improvements in Brake for Sewing-Machines, of which the following is a specification:

Our invention relates to an improvement in brakes for sewing-machines; and consists of a pivoted lever provided with a rubber cap on the end that acts against the periphery of the balance-wheel and prevents the same from a retrograde movement—the lever adjustable as to length by a piece sliding thereon and secured with a set-screw. The brake is self-acting and attachable to any sewing-machine.

Figure 1 is an end view of a sewing-machine table and embodies our invention. Fig. 2 is a perspective view of the brake.

A represents the top of the table, and B the frame for the same, constructed in the usual manner. C is the balance-wheel. The brake consists of a piece, D, fastened to the table with screws. The lever E is pivoted in the arms $d\ d$. The end of this lever is corrugated at $e$, and the rubber cap F is placed thereon, the retractile force of the rubber holding it on the lever. This lever can be extended by attaching the piece G to it. This piece G is provided with a collar, $g$, which embraces the lever, and is held thereon with the set-screw H. The end of the piece G is also corrugated, as shown at $g'$, so that the rubber cap can be used on it.

If the lever is not long enough to reach the balance-wheel, the piece G can be attached, as in different machines the balance-wheel is placed at different distances below the table; and should the rubber become worn and not engage with the wheel the brake can be lengthened.

The brake operates as follows, viz.: As the wheel is run in the direction shown by the arrow the cap rides on the periphery of the wheel; but when run in the opposite direction the brake is pulled down and acts as a stop to the wheel.

We claim as our invention—

The self-acting brake for sewing-machines, consisting of the piece D, lever E, and piece G, adjustable, as shown, the corrugations $e$ and $g'$, and rubber cap F, all arranged as shown and described, and for the purpose set forth.

LUMAN W. KINGRY.
THOMAS J. ABEL.

Witnesses:
 CHARLES P. HOUSUM,
 JACOB I. BEAR.